US006185858B1

(12) United States Patent
Choron

(10) Patent No.: US 6,185,858 B1
(45) Date of Patent: Feb. 13, 2001

(54) LEADER ATTACHMENT TOOL AND METHOD

(76) Inventor: Michael C. Choron, 3224 Bayou La., Pensacola, FL (US) 32503

( * ) Notice: Under 35 U.S.C. 154(b), the term of this patent shall be extended for 0 days.

(21) Appl. No.: 09/082,299

(22) Filed: May 19, 1998

(51) Int. Cl.[7] .......................... A01K 91/00; A01K 83/00; A01K 97/00
(52) U.S. Cl. ................... 43/44.83; 43/44.98; 43/5; 73/866.1; 73/432.1; 289/17
(58) Field of Search .................. 43/44.83, 44.98, 43/57.1, 25.2, 5; 289/17; 73/432.1, 866.1, 865.9; 139/380–81; 66/117; 433/159

(56) References Cited

U.S. PATENT DOCUMENTS

| 1,156,152 | * | 10/1915 | Knenrick | 43/44.83 |
|---|---|---|---|---|
| 2,533,418 | * | 12/1950 | Benoit | 43/44.83 |
| 3,030,984 | | 4/1962 | Vogt et al. | 140/122 |
| 3,092,152 | | 6/1963 | Neff | 140/119 |
| 3,168,118 | | 2/1965 | Holman | 140/119 |
| 3,578,035 | | 5/1971 | Parker | 140/102.5 |
| 3,660,922 | * | 5/1972 | Chill | 43/15 |
| 4,559,734 | * | 12/1985 | Sauer et al. | 43/4 |
| 4,848,018 | * | 7/1989 | Clarke | 43/43.12 |
| 4,879,835 | * | 11/1989 | Sprayberry | 43/44.83 |
| 5,138,790 | * | 8/1992 | McManus | 43/44.83 |
| 5,301,454 | * | 4/1994 | Chen | 43/42.74 |
| 5,501,688 | | 3/1996 | Whiteside et al. | 606/103 |
| 5,524,385 | * | 6/1996 | Longo | 43/44.83 |
| 5,542,843 | | 8/1996 | Price | 433/4 |
| 5,605,004 | * | 2/1997 | Boullt et al. | 43/42.13 |

FOREIGN PATENT DOCUMENTS

| 641085 | * | 5/1962 | (CA) . |
|---|---|---|---|
| 590361 | * | 12/1933 | (DE) . |
| 941208 | * | 10/1962 | (GB) . |
| 2030032A | * | 4/1980 | (GB) . |

* cited by examiner

Primary Examiner—Hezron Williams
Assistant Examiner—David J. Wiggins
(74) Attorney, Agent, or Firm—Joseph N. Breaux

(57) ABSTRACT

A leader attachment tool for use securing a wire leader within a fishing rig that includes a bent wire member including a handle portion, a right angle offset portion, an axis portion, a connecting hook with a tapered insertion end, an attachment eyelet, and a plastic sleeve handle. The leader attachment method includes the steps of 1) providing an embodiment of the leader attachment tool; 2) inserting the free end of a length of wire leader through the eye of a fishing item to be secured in a fishing rig; 3) tying the free and the connected end of the wire leader into an overhand knot about the eye of the fishing item; 4) pinching the free end of the leader material against the connected end of the leader material between the user's thumb and forefinger; 5) inserting the tapered insertion end of the connecting hook of the leader attachment tool through the eye of the fishing item; and 6) rotating the handle portion to spin the eye of the fishing item while continuing to pinch the free end of the leader material against the connected end of the leader material between the user's thumb and forefinger to tightly wind the free end of the leader material about the connected end of the leader material.

1 Claim, 2 Drawing Sheets

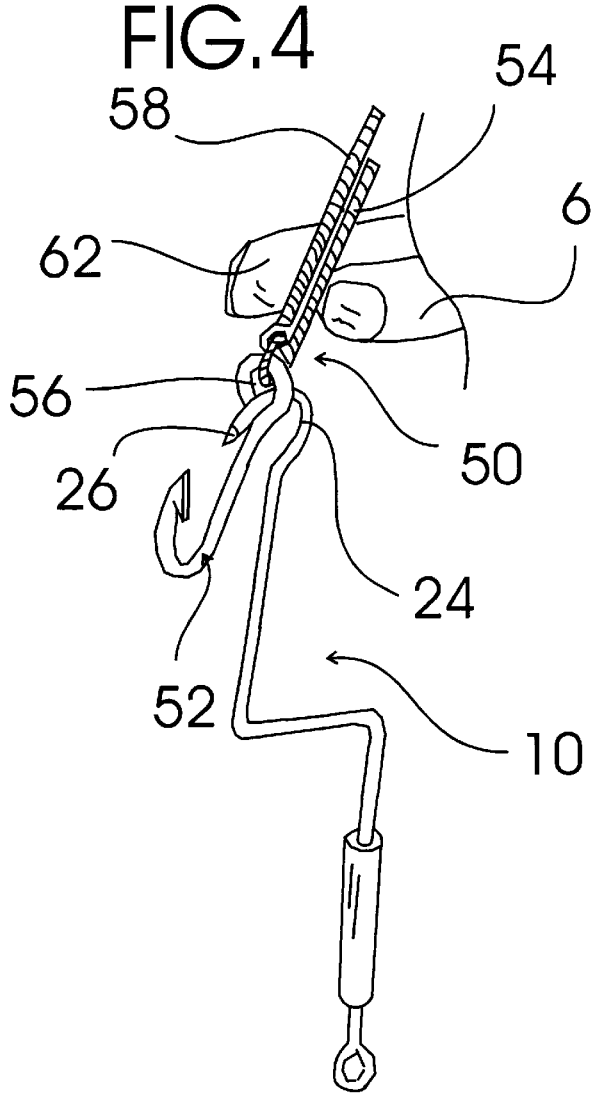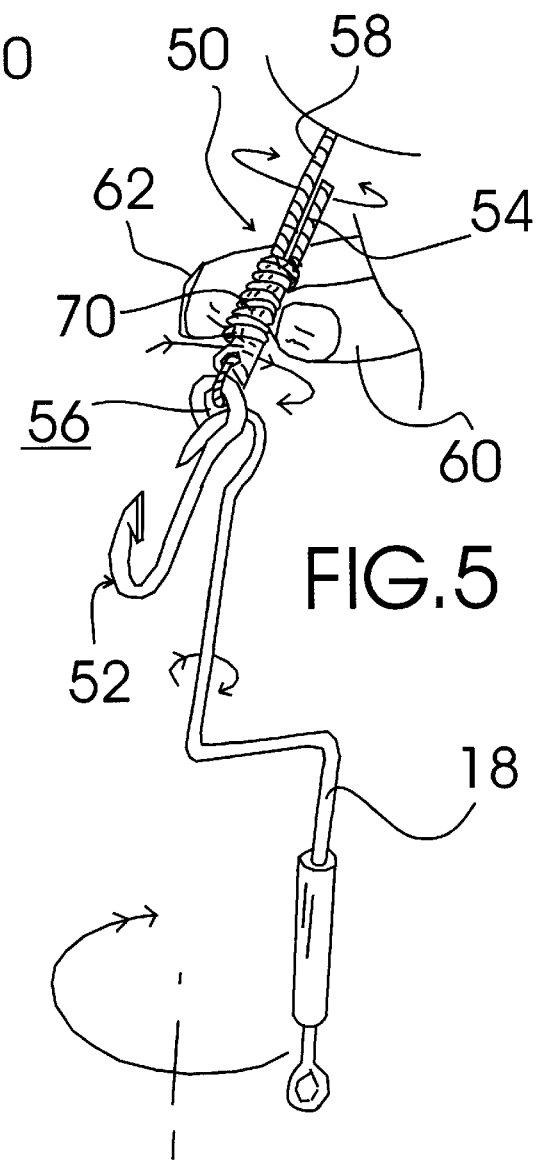

LEADER ATTACHMENT TOOL AND METHOD

TECHNICAL FIELD

The present invention relates to fishing equipment and the like and more particularly to a wire leader attachment tool and method for attaching wire leaders in fishing rigs; the leader attachment tool including a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other; the leader attachment method including the steps of providing a leader attachment tool as previously described; inserting the free end of a length of wire leader through the eye of a fishing item to be secured in a fishing rig; tying the free and the connected end of the wire leader into an overhand knot about the eye of the fishing item; pinching the free end of the leader material against the connected end of the leader material between the user's thumb and forefinger; inserting the tapered insertion end of the connecting hook of the leader attachment tool through the eye of the fishing item; and rotating the handle portion to spin the eye of the fishing item while continuing to pinch the free end of the leader material against the connected end of the leader material between the user's thumb and forefinger to tightly wind the free end of the leader material about the connected end of the leader material.

BACKGROUND ART

Attaching a wire leader in a fishing rig can be aggravating. It would be a benefit, therefore, to have a wire leader attachment tool that could ease the job of securing a wire leader within a fishing rig. In addition, it would also be a benefit to have a method of securing a wire leader in a fishing rig that was easily learned and that provided a tightly wound connection between the wire fishing leader and the eye of a fishing item such as a fish hook swivel, lure, etc.

GENERAL SUMMARY DISCUSSION OF INVENTION

It is thus an object of the invention to provide a leader attachment tool for use securing a wire leader within a fishing rig.

It is a further object of the invention to provide a leader attachment tool that includes a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other.

It is a still further object of the invention to provide a leader attachment method that is easily learned and that results in a tightly wound connection between the wire fishing leader and the eye of a fishing item such as a fish hook swivel, lure, etc.

It is a still further object of the invention to provide a leader attachment method that includes the steps of 1) providing a leader attachment tool including a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other; 2) inserting the free end of a length of wire leader through the eye of a fishing item to be secured in a fishing rig; 3) tying the free and the connected end of the wire leader into an overhand knot about the eye of the fishing item; 4) pinching the free end of the leader material against the connected end of the leader material between the user's thumb and forefinger; 5) inserting the tapered insertion end of the connecting hook of the leader attachment tool through the eye of the fishing item; and 6) rotating the handle portion to spin the eye of the fishing item while continuing to pinch the free end of the leader material against the connected end of the leader material between the user's thumb and forefinger to tightly wind the free end of the leader material about the connected end of the leader material.

It is a still further object of the invention to provide a leader attachment tool and method that accomplishes some or all of the above objects in combination.

Accordingly, in a first aspect of the invention a leader attachment tool is provided that includes a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other.

In a second aspect of the invention a leader attachment method is provided that includes the steps of 1) providing a leader attachment tool including a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other; 2) inserting the free end of a length of wire leader through the eye of a fishing item to be secured in a fishing rig; 3) tying the free and the connected end of the wire leader into an overhand knot about the eye of the fishing item; 4) pinching the free end of the leader material against the connected end of the leader material between the user's thumb and forefinger; 5) inserting the tapered insertion end of the connecting hook of the leader attachment tool through the eye of the fishing item; and 6) rotating the handle portion to spin the eye of the fishing item while continuing to pinch the free end of the leader material against the connected end of the leader material between the user's thumb and forefinger to tightly wind the free end of the leader material about the connected end of the leader material.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 4 is a Partial perspective view showing the loose overhand knot tightened, the free end of the leader material pinched against the connected end of the leader material by the user's thumb and forefinger and the tapered insertion end of the connecting hook of the leader attachment tool of FIG. 1 inserted through the eye of the fish hook.

FIG. 5 is a second partial perspective view showing the fish hook, leader section and leader attachment tool of FIG. 5 after several rotations of the handle portion have been performed twisting the free end of the leader tightly about the connected end of the leader material.

EXEMPLARY MODE FOR CARRYING OUT THE INVENTION

Figure 1:
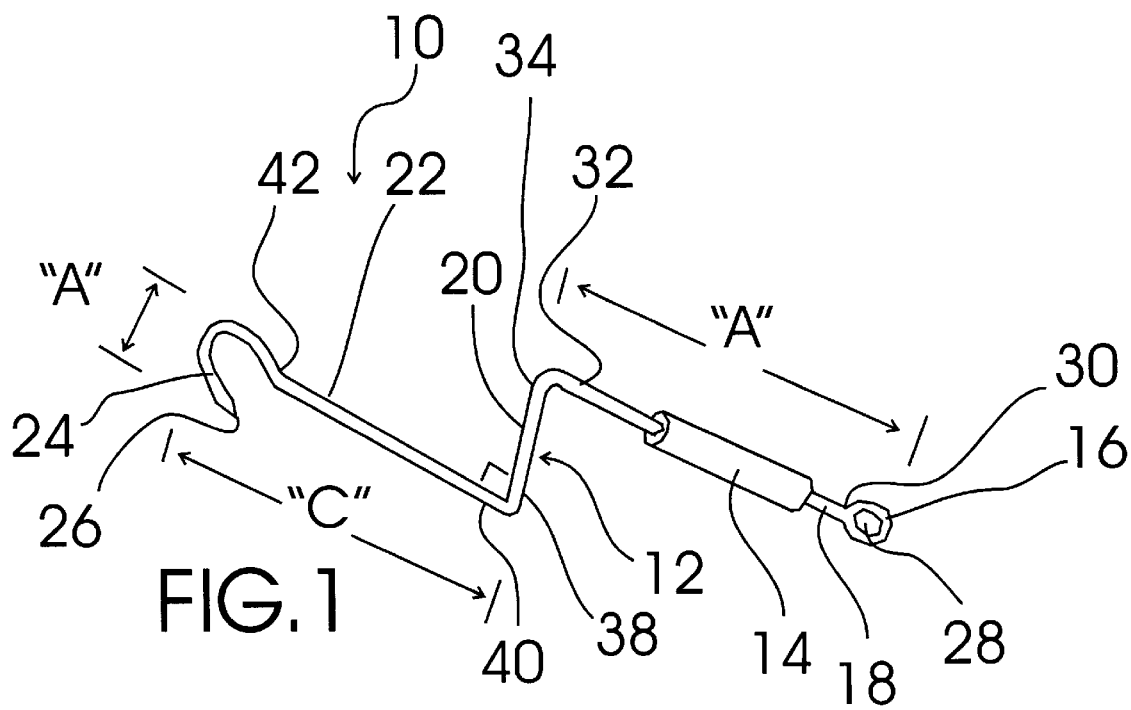
FIG. 1 is a perspective view of an exemplary embodiment of the leader attachment tool of the present invention showing the bent wire member including the attachment eyelet, the handle portion, the right angle offset portion, the axis portion, and the connecting hook with the tapered insertion end; and the plastic sleeve handle rotatably positioned over the handle portion of the bent wire member.

FIG. 1 shows an exemplary embodiment of the leader attachment tool of the present invention, generally designated 10. Leader attachment tool 10 includes a bent wire member, generally designated 12, and a tubular plastic sleeve handle 14. Bent wire member 12 is of bent, stainless steel rod construction and includes an attachment eyelet 16, a handle portion 18, a right angle offset portion 20, an axis portion 22, and a connecting hook 24 with a tapered insertion end 26. Attachment eyelet 16 has an eyelet opening 18 that is sized to fit over the end of a nail of other rod shaped support for supporting attachment tool 10 when it is not needed. Handle portion 18 is straight, of a length "A" of three and one-half inches (3½") and terminates at a far end 30 in attachment eyelet 16 and at a near end 32 in a right angled integral connection with one end 34 of right angle offset portion 20. Right angled offset portion 20 is straight, of a length "B" of two inches (2") and terminates at another end 38 in a right angled integral connection with a rear end 40 of axis portion 22. Axis portion 22 is straight, oriented in parallel with handle portion 18, of a length "C" of three and one-half inches (3½") and has a front end 42 that terminates in an integral connection with connecting hook 24. Connecting hook 24 is semi-circular shaped and has a diameter "D" of one-half inch (½"). Plastic sleeve handle 14 is a two and one-half inch (2½") length of rigid plastic tubing that is rotatably trapped on handle portion 18 between attachment eyelet 16 and right angle offset portion 20.

Figures 2, 3:
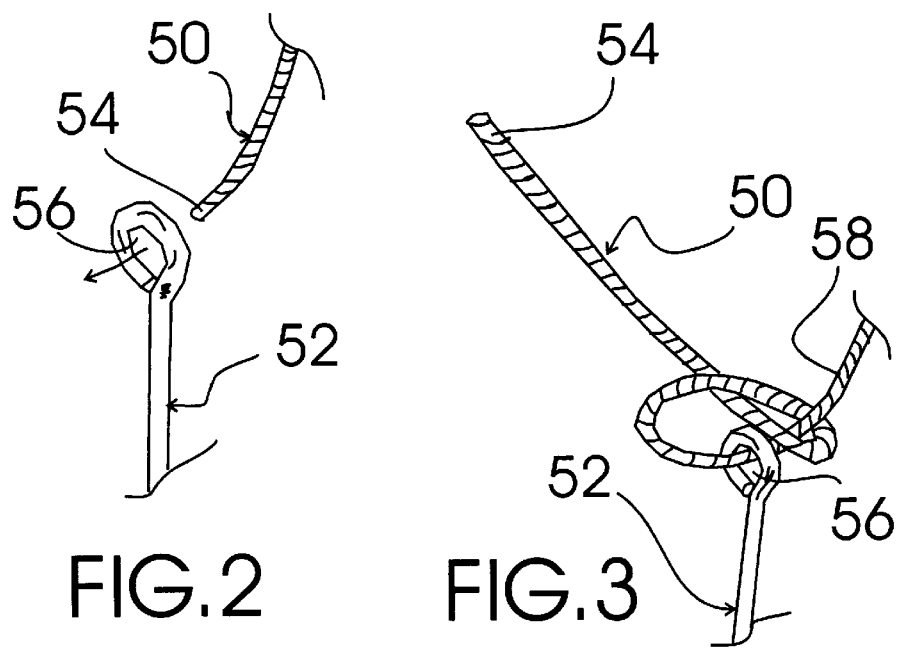
FIG. 2 is a partial perspective view showing the eye of a representative fish hook shank and the end of a length of wire leader.
FIG. 3 is a partial perspective view showing the end of the length of wire leader threaded through the eye of the fish hook shank and tied into a loose overhand knot.

An exemplary method of attaching a wire leader to a fish hook is now described. The first step of the exemplary leader attachment method is 1) providing a leader attachment tool 10 as described herein above. With reference to FIG. 2, the second step is 2) providing a length or wire leader material, generally designated 50 to be used to attach a fishing item, such as a fish hook, generally designated 52. The third step 3) is to insert the free end 54 of wire leader 50 through the eye 56 of fishing item 52. With reference to FIG. 3, the fourth step is 4) tying the free end 54 and a connected end 58 of wire leader 50 into a conventional overhand knot about eye 56 of fishing item 56. With reference now to FIG. 4, the fifth step is 5) pinching free end 54 of leader 50 against connected end 58 of leader 50 between the user's thumb 60 and forefinger 62 and then inserting tapered insertion end 26 of connecting hook 24 of leader attachment tool through eye 56 of fishing item 52. With reference to FIG. 5, the sixth step is 6) rotating handle portion 18 to spin eye 56 of fishing item 52 while continuing to pinch free end of leader 50 against connected end of leader 50 between the user's thumb 60 and forefinger 62 to form windings 70 formed from free end 54 about connected end 58. It can be seen from the preceding description that in a first aspect of the invention a leader attachment tool for use securing a wire leader within a fishing rig has been provided that includes a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other; and in a second aspect of the invention a leader attachment method has been provided that is easily learned; that results in a tightly wound connection between the wire fishing leader and the eye of a fishing item such as a fish hook swivel, lure, etc.; and that includes the steps of 1) providing a leader attachment tool including a bent wire member including a handle portion, a right angle offset portion, an axis portion, a connecting hook with a tapered insertion end, an attachment eyelet, and a plastic sleeve handle; the handle portion terminating at a far end in the attachment eyelet and at a near end in a right angled integral connection with one end of the right angle offset portion; the right angled offset portion terminating at another end in a right angled integral connection with the rear end of the axis portion; the front end of the axis portion terminating in an integral connection with the connecting hook; the plastic sleeve handle being rotatably positioned over the handle portion of the bent wire member; the handle portion and the axis portion being oriented in parallel with each other; 2) inserting the free end of a length of wire leader through the eye of a fishing item to be secured in a fishing rig; 3) tying the free and the connected end of the wire leader into an overhand knot about the eye of the fishing item; 4) pinching the free end of the leader material against the connected end of the leader material between the user's thumb and forefinger; 5) inserting the tapered insertion end of the connecting hook of the leader attachment tool through the eye of the fishing item; and 6) rotating the handle portion to spin the eye of the fishing item while continuing to pinch the free end of the leader material against the connected end of the leader material between the user's thumb and forefinger to tightly wind the free end of the leader material about the connected end of the leader material.

It is noted that the embodiment of the leader attachment tool and method described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A leader attachment method for attaching a wire leader having a free end and a connected end to a fishing item having an eye, said method comprising the steps of:

a) providing a leader attachment tool including a bent wire member including a handle portion, a right angle offset portion, an axis portion having a front end and a rear end, a connecting hook with a tapered insertion end, an attachment eyelet, and a plastic tubular sleeve handle;

said handle portion terminating at a far end in said attachment eyelet and at a near end in a right angled integral connection with one end of said right angle offset portion;

said right angled offset portion terminating at another end in a right angled integral connection with said rear end of said axis portion;

said front end of said axis portion terminating in an integral connection with said connecting hook;

said plastic sleeve handle being configured to slide or twist over and become rotatably positioned over said handle portion of said bent wire member;

said handle portion and said axis portion being oriented in parallel with each other;

b) inserting a free end of a length of wire leader through an eye of a fishing item to be secured in a fishing rig;

c) tying the free end and the connected end of the wire leader into an overhand knot about the eye of the fishing item;

d) pinching the free end of the wire leader against the connected end of the wire leader between a user's thumb and forefinger;

e) inserting said tapered insertion end of said connecting hook of said leader attachment tool through the eye of the fishing item; and f) rotating said handle portion to spin the eye of the fishing item while continuing to pinch the free end of the leader material against the connected end of the wire leader between the user's thumb and forefinger to tightly wind the free end of the wire leader helically about the connected end of the wire leader.

* * * * *